United States Patent
Hong

(10) Patent No.: US 9,216,769 B2
(45) Date of Patent: Dec. 22, 2015

(54) COWL CROSS MEMBER MOUNTING ASSEMBLY FOR VEHICLE

(71) Applicant: Hyundai Motor Company, Seoul (KR)

(72) Inventor: Jang Won Hong, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/304,766

(22) Filed: Jun. 13, 2014

(65) Prior Publication Data

US 2015/0166113 A1  Jun. 18, 2015

(30) Foreign Application Priority Data

Dec. 18, 2013 (KR) .................. 10-2013-0158688

(51) Int. Cl.
*B62D 25/08* (2006.01)
(52) U.S. Cl.
CPC .............. *B62D 25/08* (2013.01); *B62D 25/081* (2013.01); *B62D 25/088* (2013.01)
(58) Field of Classification Search
CPC ...... B62D 25/04; B62D 25/08; B62D 25/081; B62D 25/082; B62D 25/088; B62D 25/14; B62D 25/145
See application file for complete search history.

(56) References Cited

U.S. PATENT DOCUMENTS 8,876,194 B2 *  11/2014  Dix et al. .................. 296/187.09
8,899,662 B2 *  12/2014  Kido et al. ............... 296/187.09
2013/0134742 A1 *  5/2013  Mildner et al. .......... 296/203.02
2013/0169003 A1 *  7/2013  Kubo et al. .............. 296/187.09
2013/0181482 A1 *  7/2013  Suzaki et al. ................. 296/192
2013/0221708 A1 *  8/2013  Hanakawa ............... 296/193.09
2014/0049072 A1 *  2/2014  Kim et al. ................. 296/193.09
2014/0049073 A1 *  2/2014  Kawachi et al. ......... 296/193.09
2014/0097642 A1 *  4/2014  Kim et al. ...................... 296/192
2014/0152044 A1 *  6/2014  Kaneko ............................ 296/72
2014/0367994 A1 *  12/2014  Sasaki et al. ............. 296/187.09
2015/0021953 A1 *  1/2015  Chung et al. ............. 296/187.09
2015/0054308 A1 *  2/2015  Mildner et al. .......... 296/187.09
2015/0083514 A1 *  3/2015  Asano et al. .................. 180/312

FOREIGN PATENT DOCUMENTS

| JP | 2004-276789 A | 10/2004 |
|---|---|---|
| JP | 2005-335579 A | 12/2005 |
| JP | 2010-83188 A | 4/2010 |
| JP | 2010-83321 A | 4/2010 |
| KR | 10-0534399 B1 | 12/2005 |

* cited by examiner

*Primary Examiner* — Gregory Blankenship
(74) *Attorney, Agent, or Firm* — Morgan, Lewis & Bockius LLP

(57) ABSTRACT

A cowl cross member mounting assembly for a vehicle, may include front side members that may be respectively formed on both lower sides of an engine compartment, a shock absorber housing that may be formed between the front side members and a fender apron upper member, a dash lower panel that separates the engine compartment from an inside of the vehicle, a cowl cross bar that may be connected to both sides of the dash lower panel, and a reinforcing member that may be connected to the cowl cross bar while being bonded between the shock absorber housing and the dash lower panel.

5 Claims, 4 Drawing Sheets

COWL CROSS MEMBER MOUNTING ASSEMBLY FOR VEHICLE

CROSS-REFERENCE TO RELATED APPLICATION

The present application claims priority to and the benefit of Korean Patent Application No. 10-2013-0158688 filed on Dec. 18, 2013, the entire contents of which is incorporated herein for all purposes by this reference.

BACKGROUND OF THE INVENTION

1. Field of the Invention

The present invention relates to a cowl cross member mounting assembly for a vehicle, and more particularly, to a cowl cross member mounting assembly for a vehicle which can reduce an injury of an occupant by supporting impact energy transferred from a front of a vehicle when a small overlap impact occurs.

2. Description of Related Art

In general, a vehicle body of a vehicle has a box shape by appropriately combining various panels and frames, and a vehicle body obtained by integrally manufacturing the frames and bodies through such combining is called a monocoque structure.

An assembly sequence of the monocoque structure is decided according to a layout of a production line of a vehicle manufacturer. In general, a front body, a center body, a rear body, and a dash are firstly assembled, a side structure is secondly assembled, and a cowl part is finally attached.

Among the components, the front body structure includes front side members that are respectively formed on both lower sides of an engine compartment, a shock absorber housing that is formed between the front side member and a fender apron upper member formed on a front side surface of the vehicle, a dash lower panel that separates the engine compartment from the inside of the vehicle, and a cowl cross bar that is connected to both sides of the dash lower panel in a vehicle width direction.

Here, in the conventional front body structure, a reinforcing member that supports impact energy to protect an occupant when a small overlap impact of the vehicle occurs is installed. The reinforcing member supports the impact energy transferred from a front of the vehicle by connecting one end of the reinforcing member to a front surface of the dash lower panel and the other end thereof to a side surface of the dash lower panel.

However, since the conventional reinforcing member is connected to only the front and the side surfaces of the dash lower panel, when the small overlap impact occurs, the fender apron upper member and the shock absorber housing may infiltrate into the vehicle. Furthermore, as the dash lower panel and a front pillar are broken and separated, the injury of the occupant of the vehicle may be serious.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cowl cross member mounting assembly for a vehicle having advantages of reducing an injury of an occupant of a vehicle by applying a reinforcing member between a shock absorber housing and a dash lower panel to prevent a fender apron upper member and the shock absorber housing from infiltrating into the vehicle when a small overlap impact occurs.

An exemplary embodiment of the present invention provides a cowl cross member mounting assembly for a vehicle including front side members that are respectively on both lower sides of an engine compartment, a shock absorber housing that is formed between the front side member and a fender apron upper member, a dash lower panel that separates the engine compartment from the inside of the vehicle, a cowl cross bar that is connected to both sides of the dash lower panel, and a reinforcing member that is connected to the cowl cross bar while being bonded between the shock absorber housing and the dash lower panel.

A welding flange that is bonded to the shock absorber housing and the dash lower panel through welding may be formed at an edge of the reinforcing member.

The reinforcing member may have a hollow shape.

The reinforcing member may be formed to be inclined upward with the shock absorber housing as a reference.

A supporting member of which one end is connected to the reinforcing member and the cowl cross bar and the other end is connected to the dash lower panel may be provided within the reinforcing member.

The supporting member may have a circular pipe shape.

According to the exemplary embodiments of the present invention, it is possible to reduce the injury of the occupant of the vehicle by applying the reinforcing member between the shock absorber housing and the dash lower panel to prevent the fender apron upper member and the shock absorber housing from infiltrating into the vehicle when the small overlap impact occurs.

Further, according to the exemplary embodiments of the present invention, it is possible to reduce the injury of the occupant of the vehicle by applying the supporting member between the reinforcing member, the cowl cross bar, and the dash lower panel to prevent the dash lower panel and the front pillar from being broken and separated when the small overlap impact of the vehicle occurs.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
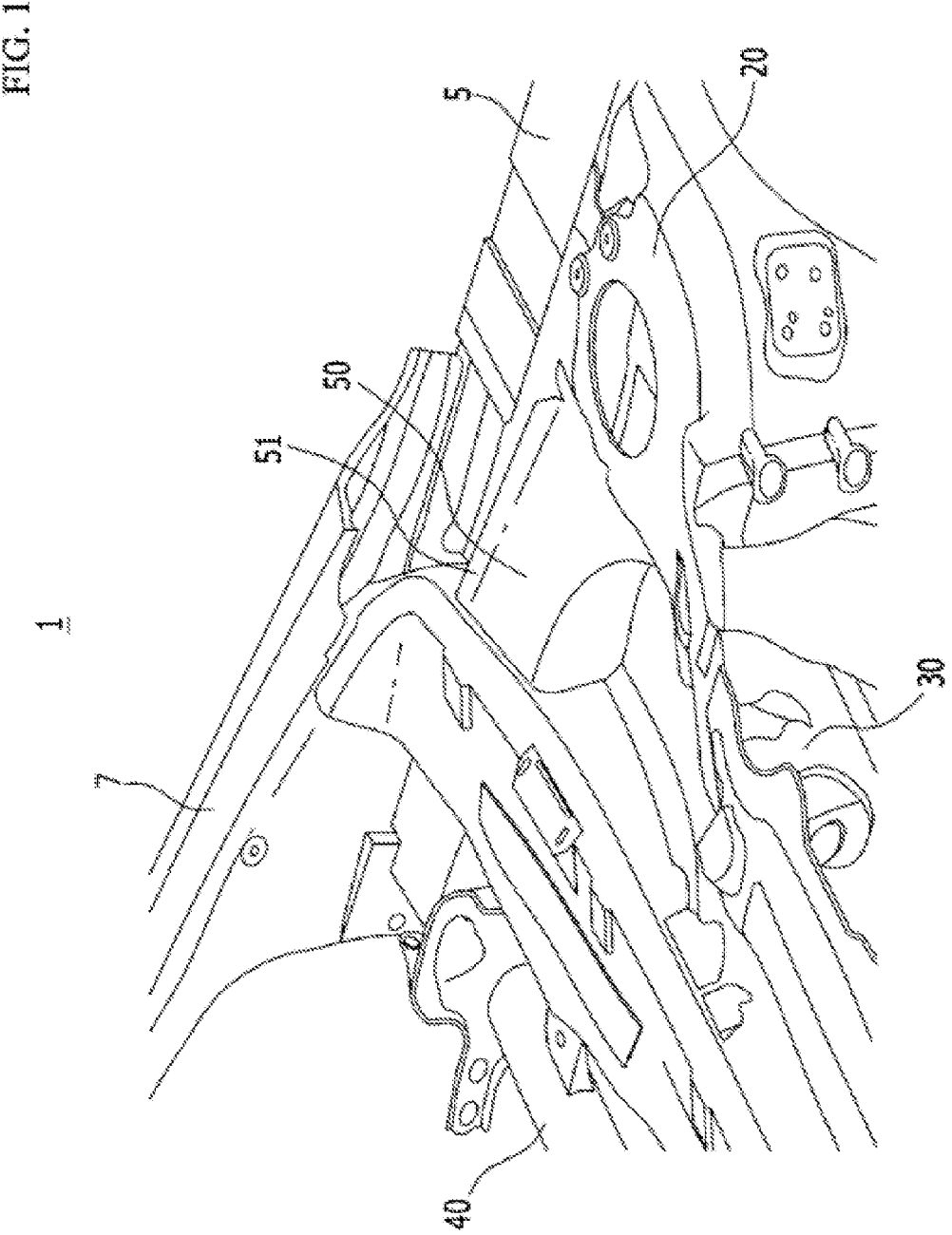
FIG. 1 is a front perspective view of a cowl cross member mounting assembly for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

In the drawings, sizes and thicknesses of components are arbitrarily illustrated for the convenience in description, and, thus, the present invention is not necessarily limited to the drawings. The thicknesses thereof are thickly illustrated to clarify various portions and regions.

Unrelated parts will be omitted to clearly describe the exemplary embodiment of the present invention.

Figure 2:
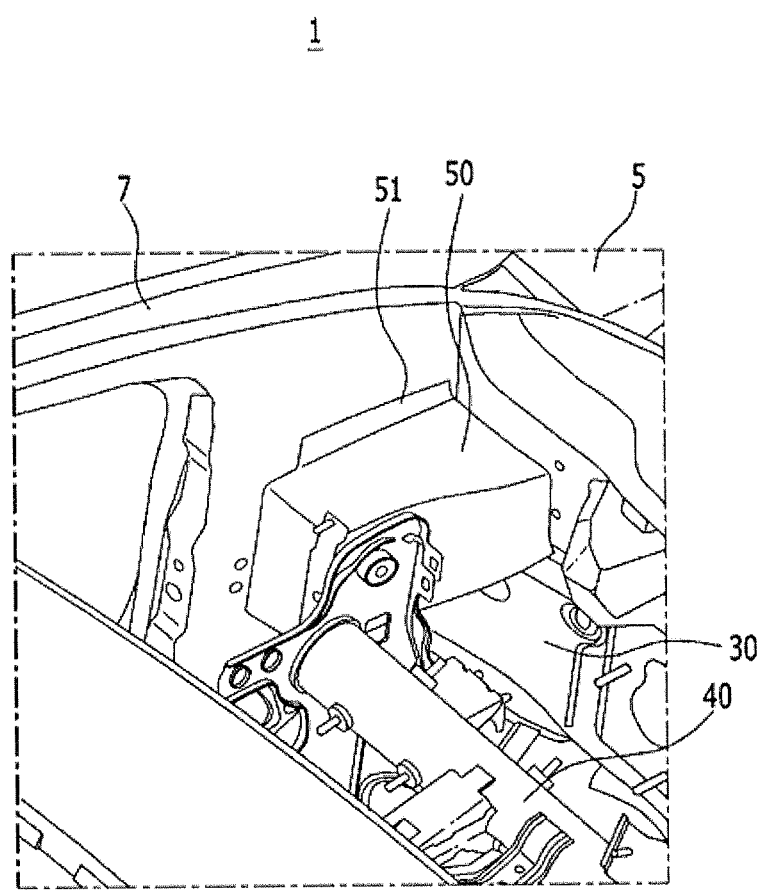
FIG. 2 is a rear perspective view of the cowl cross member mounting assembly for a vehicle according to the exemplary embodiment of the present invention.
Figure 3:
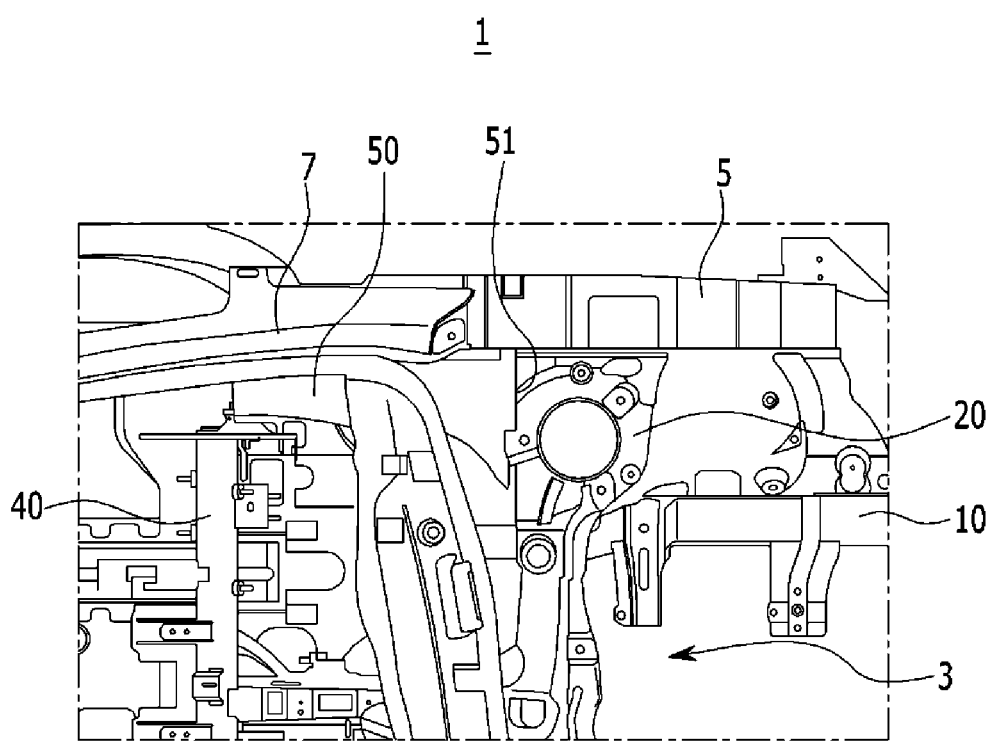
FIG. 3 is a front view of the cowl cross member mounting assembly for a vehicle according to the exemplary embodiment of the present invention.
Figure 4:
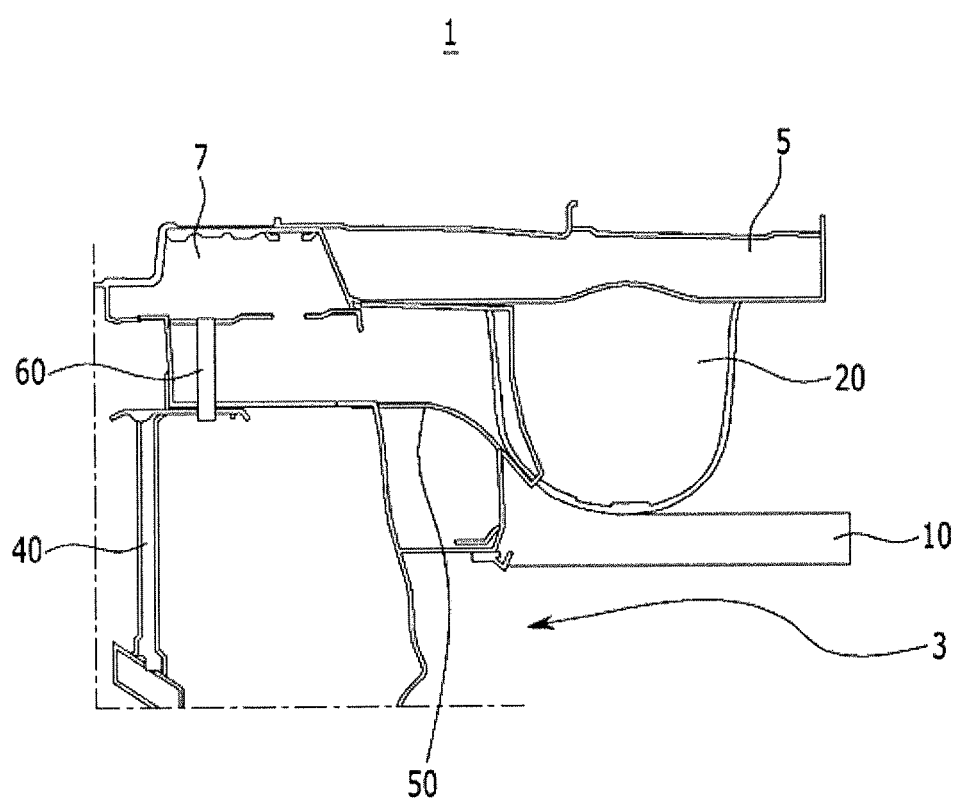
FIG. 4 is a schematic conceptual diagram of the cowl cross member mounting assembly for a vehicle according to the exemplary embodiment of the present invention.

FIG. 1 is a front perspective view of a cowl cross member mounting assembly for a vehicle according to an exemplary embodiment of the present invention, FIG. 2 is a rear perspective view of the cowl cross member mounting assembly for a vehicle according to the exemplary embodiment of the present invention, FIG. 3 is a front view of the cowl cross member mounting assembly for a vehicle according to the exemplary embodiment of the present invention, and FIG. 4 is a schematic conceptual diagram of the cowl cross member mounting assembly for a vehicle according to the exemplary embodiment of the present invention.

Referring to FIGS. 1 to 4, a cowl cross member mounting assembly 1 according to an exemplary embodiment of the present invention has a structure that reduces an injury of an occupant by supporting impact energy transferred from a front of a vehicle when a small overlap impact occurs.

To achieve this, the cowl cross member mounting assembly 1 according to the exemplary embodiment of the present invention includes front side members 10, a shock absorber housing 20, a dash lower panel 30, a cowl cross bar 40, and a reinforcing member 50.

The front side members 10 are respectively formed on both lower sides of an engine compartment 3.

The shock absorber housing 20 is formed between the front side members 10 and a fender apron upper member 5 formed on a front side surface of the vehicle.

The dash lower panel 30 separates the engine compartment 3 from the inside of the vehicle, and the cowl cross bar 40 is connected to both sides of the dash lower panel 30 in a vehicle width direction.

In the exemplary embodiment of the present invention, the reinforcing member 50 is connected to a side surface of the cowl cross bar 40 while being bonded between the shock absorber housing 20 and the dash lower panel 30.

Here, a welding flange 51 that is bonded to the shock absorber housing 20 and the dash lower panel 30 through welding may be formed at an edge of the reinforcing member 50, and the reinforcing member 50 may be bonded to the shock absorber housing 20 and the dash lower panel 30 by the welding flange 51 through spot welding or CO2 welding.

The reinforcing member 50 has a hollow shape, and is formed to effectively absorb the impact energy generated when the small overlap impact of the vehicle occurs.

Further, the reinforcing member 50 is formed to be inclined upward with the shock absorber housing 20 as a reference, and the entire shape of the reinforcing member has a triangle shape.

Meanwhile, a supporting member 60 in which one end is connected to the reinforcing member 50 and the cowl cross bar 40 and the other end is connected to the dash lower panel 30 may be provided inside the reinforcing member 50, and the supporting member 60 may have a circular pipe shape.

That is, in order to prevent the dash lower panel 30 and a front pillar 7 that is integrally formed with the dash lower panel 30 from being broken and separated by the impact energy when the small overlap impact of the vehicle occurs, the supporting member 60 is connected between the reinforcing member 50, the cowl cross bar 40, and the dash lower panel 30.

As described above, in the cowl cross member mounting assembly 1 for a vehicle according to the exemplary embodiment of the present invention, when the small overlap impact of the vehicle occurs, the impact energy generated from the front of the vehicle is transferred to the fender apron upper member 5 and the shock absorber housing 20.

In this case, the reinforcing member 50 bonded between the shock absorber housing 20 and the dash lower panel 30 supports the impact energy transferred to the fender apron upper member 5 and the shock absorber housing 20 to prevent the fender apron upper member 5 and the shock absorber housing 20 from being rotated.

Further, when the small overlap impact of the vehicle occurs, the impact energy generated from the front of the vehicle is transferred to the dash lower panel 30.

In this case, the supporting member 60 connected between the reinforcing member 50, the cowl cross bar 40, and the dash lower panel 30 supports the impact energy transferred to the dash lower panel 30 to prevent the dash lower panel 30 and the front pillar 7 that is integrally formed with the dash lower panel 30 from being broken and separated.

Accordingly, in the cowl cross member mounting assembly 1 according to the exemplary embodiment of the present invention, by applying the reinforcing member 50 between the shock absorber housing 20 and the dash lower panel 30, when the small overlap impact of the vehicle occurs, the fender apron upper member 5 and the shock absorber housing 20 can be prevented from infiltrating into the vehicle, so that it is possible to reduce the injury of the occupant of the vehicle.

Further, by applying the supporting member 60 between the reinforcing member 50, the cowl cross bar 40, and the dash lower panel 30, when the small overlap impact of the vehicle occurs, the dash lower panel 30 and the front pillar 7 can be prevented from being broken and separated, so that it is possible to reduce the injury of the occupant of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cowl cross member mounting assembly for a vehicle, comprising:
    front side members that are respectively formed on both lower sides of an engine compartment;
    a shock absorber housing that is formed between the front side members and a fender apron upper member;
    a dash lower panel that separates the engine compartment from an inside of the vehicle;
    a cowl cross bar that is connected to two sides of the dash lower panel in a width direction of the vehicle;
    a reinforcing member that is connected to the cowl cross bar and bonded between the shock absorber housing and the dash lower panel; and
    a supporting member including:
        a first end connected to the reinforcing member and the cowl cross bar; and
        a second end connected to the dash lower panel,
    wherein the supporting member is provided within the reinforcing member.

2. The cowl cross member mounting assembly for the vehicle of claim 1, wherein a welding flange that is bonded to the shock absorber housing and the dash lower panel through welding is formed at an edge of the reinforcing member.

3. The cowl cross member mounting assembly for the vehicle of claim 1, wherein the reinforcing member has a hollow shape.

4. The cowl cross member mounting assembly for the vehicle of claim 1, wherein the reinforcing member is formed to be inclined upward with the shock absorber housing as a reference.

5. The cowl cross member mounting assembly for the vehicle of claim 1, wherein the supporting member has a circular pipe shape.

* * * * *